US012684131B2

(12) United States Patent
Tsai et al.

(10) Patent No.: US 12,684,131 B2
(45) Date of Patent: Jul. 14, 2026

(54) IMAGE PROCESSING FREQUENCY MANAGING METHOD AND IMAGE PROCESSING SYSTEM

(71) Applicant: MEDIATEK INC., Hsinchu City (TW)

(72) Inventors: Min-Han Tsai, Hsinchu City (TW);
Kuan-Hung Chou, Hsinchu City (TW);
Chieh-Ling Chen, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 18/925,002

(22) Filed: Oct. 23, 2024

(65) Prior Publication Data

US 2025/0142084 A1      May 1, 2025

Related U.S. Application Data

(60) Provisional application No. 63/593,546, filed on Oct. 27, 2023.

(51) Int. Cl.
*H04N 19/152* (2014.01)

(52) U.S. Cl.
CPC .................................. *H04N 19/152* (2014.11)

(58) Field of Classification Search
CPC combination set(s) only.
See application file for complete search history.

(56) References Cited

U.S. PATENT DOCUMENTS

| | | | | |
|---|---|---|---|---|
| 6,600,835 B1 * | 7/2003 | Ishikawa | .............. | H04N 19/114 375/E7.22 |
| 9,106,887 B1 * | 8/2015 | Owen | ...................... | H04L 47/52 |
| 2008/0103715 A1 * | 5/2008 | Tsuda | ........................ | G07C 3/00 702/81 |
| 2010/0246395 A1 * | 9/2010 | Itaya | .................. | H04N 21/6473 375/240.19 |
| 2025/0142084 A1 * | 5/2025 | Tsai | ...................... | H04N 19/156 |

FOREIGN PATENT DOCUMENTS

| | | | | |
|---|---|---|---|---|
| CN | 1998239 A | * 7/2007 | ....... | H04N 21/44004 |
| CN | 102714619 B | * 2/2016 | ........... | H04L 47/564 |
| WO | WO-2010150470 A1 | * 12/2010 | ............. | H04N 19/61 |

* cited by examiner

*Primary Examiner* — Tracy Y. Li
(74) *Attorney, Agent, or Firm* — Winston Hsu

(57) ABSTRACT

An electronic device comprising an image processing device, comprising: (a) monitoring a reception speed of image data, which is received by the electronic device; and (b) adjusting an image processing frequency of the image processing device according to the reception speed. The step (a) may monitor a queuing speed of an input buffer receiving an image data stream to acquire the reception speed.

10 Claims, 5 Drawing Sheets

IMAGE PROCESSING FREQUENCY MANAGING METHOD AND IMAGE PROCESSING SYSTEM

CROSS REFERENCE TO RELATED APPLICATIONS

This application claims the benefit of U.S. Provisional Application No. 63/593,546, filed on Oct. 27, 2023. The content of the application is incorporated herein by reference.

BACKGROUND

The present application relates to an image processing frequency managing method and an image processing system, and particularly relates to an image processing frequency managing method and an image processing system which can dynamically adjust the image processing frequency responding to an actual demand.

With the development of science and technology, image processing systems are becoming more and more popular and their functions are becoming more and more powerful. The image processing system processes images at an image processing frequency. However, such image processing frequency is always fixed, or needs a complicated manually setting procedure to change.

If the image processing frequency is set too high, unnecessary power consumption will occur. However, if the image processing frequency is set too low, it will affect the overall system performance. Therefore, a new mechanism is needed to dynamically adjust the image processing frequency according to actual demand.

SUMMARY

One objective of the present application is to provide an image processing frequency managing method which can dynamically adjust the image processing frequency according to actual demand.

Another objective of the present application is to provide an image processing system which can dynamically adjust the image processing frequency according to actual demand.

One embodiment of the present application discloses an image processing frequency managing method, applied to an electronic device comprising an image processing device, comprising: (a) monitoring a reception speed of image data, which is received by the electronic device; and (b) adjusting an image processing frequency of the image processing device according to the reception speed.

The step (a) may monitor a queuing speed of an input buffer receiving an image data stream to acquire the reception speed.

Another embodiment of the present application discloses an image processing system, comprising: an image processing device; a processing circuit, configured to perform following steps: (a) monitoring a reception speed of image data, which is received by the electronic device; and (b) adjusting an image processing frequency of the image processing device according to the reception speed.

The image processing system of the present invention may further comprise an input buffer, and the step (a) monitors a queuing speed of the input buffer receiving an image data stream to acquire the reception speed.

The reception speed of image data may mean the image data which is really needed to be processed. Accordingly, in view of above-mentioned embodiments, the image processing frequency can be dynamically adjusted according to actual demand.

These and other objectives of the present invention will no doubt become obvious to those of ordinary skill in the art after reading the following detailed description of the preferred embodiment that is illustrated in the various figures and drawings.

DETAILED DESCRIPTION

In the following descriptions, several embodiments are provided to explain the concept of the present application. It will be appreciated that the system, the device, the apparatus or the module depicted in following embodiments can be implemented by hardware (ex. circuit) or the combination of hardware and software (ex. a processing unit executing at least one program). The term "first", "second", "third" in following descriptions are only for the purpose of distinguishing different one elements, and do not mean the sequence of the elements. For example, a first device and a second device only mean these devices can have the same structure but are different devices.

Figure 1:
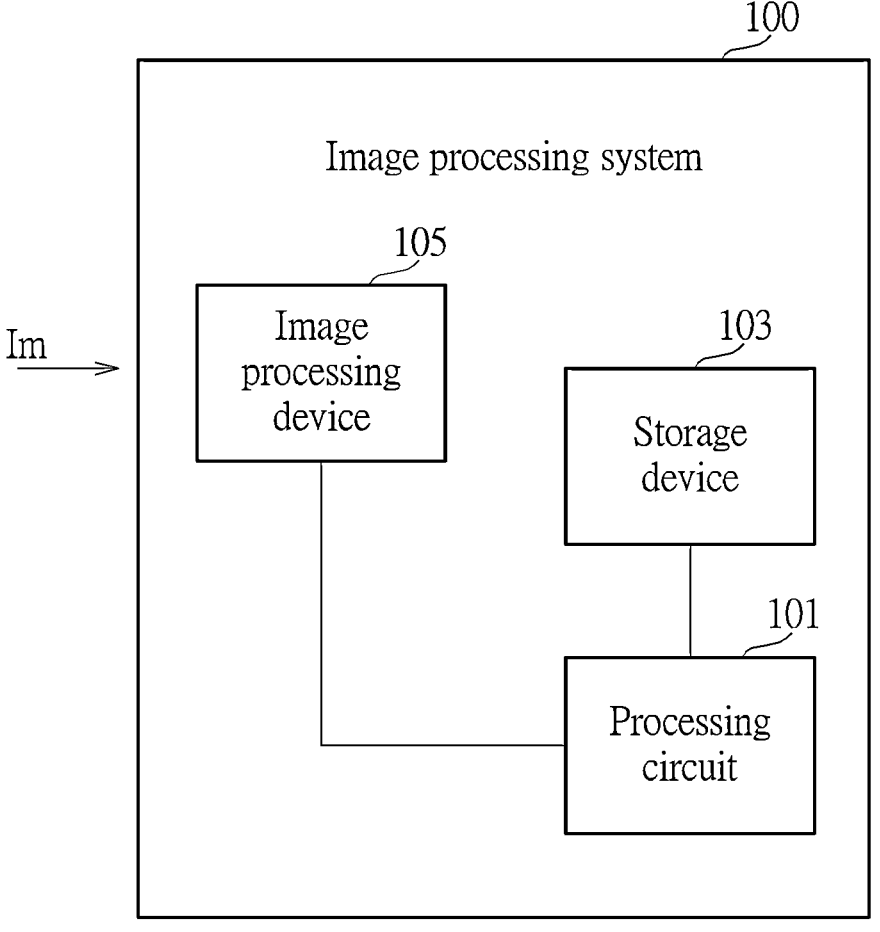
FIG. 1 is a block diagram illustrating an image processing system according to one embodiment of the present application.

FIG. 1 is a block diagram illustrating an image processing system according to one embodiment of the present application. As illustrated in FIG. 1, the image processing system 100 comprises a processing circuit 101, a storage device 103 and an image processing device 105. The image processing system 100 may be any electronic device which can perform image processing, such as a mobile phone, a laptop, or a tablet computer. The storage device 103 may be provided inside or outside the image processing system 100. The processing circuit 101 is configured to execute at least one program stored in the storage device 103, to control operations of the image processing system 100. The image processing system 100 receives image data Im. A reception speed of the image data Im is monitored by the processing circuit 101. Then, an image processing frequency of the image processing device 105 is set by the processing circuit 101 according to the reception speed.

Figure 2:
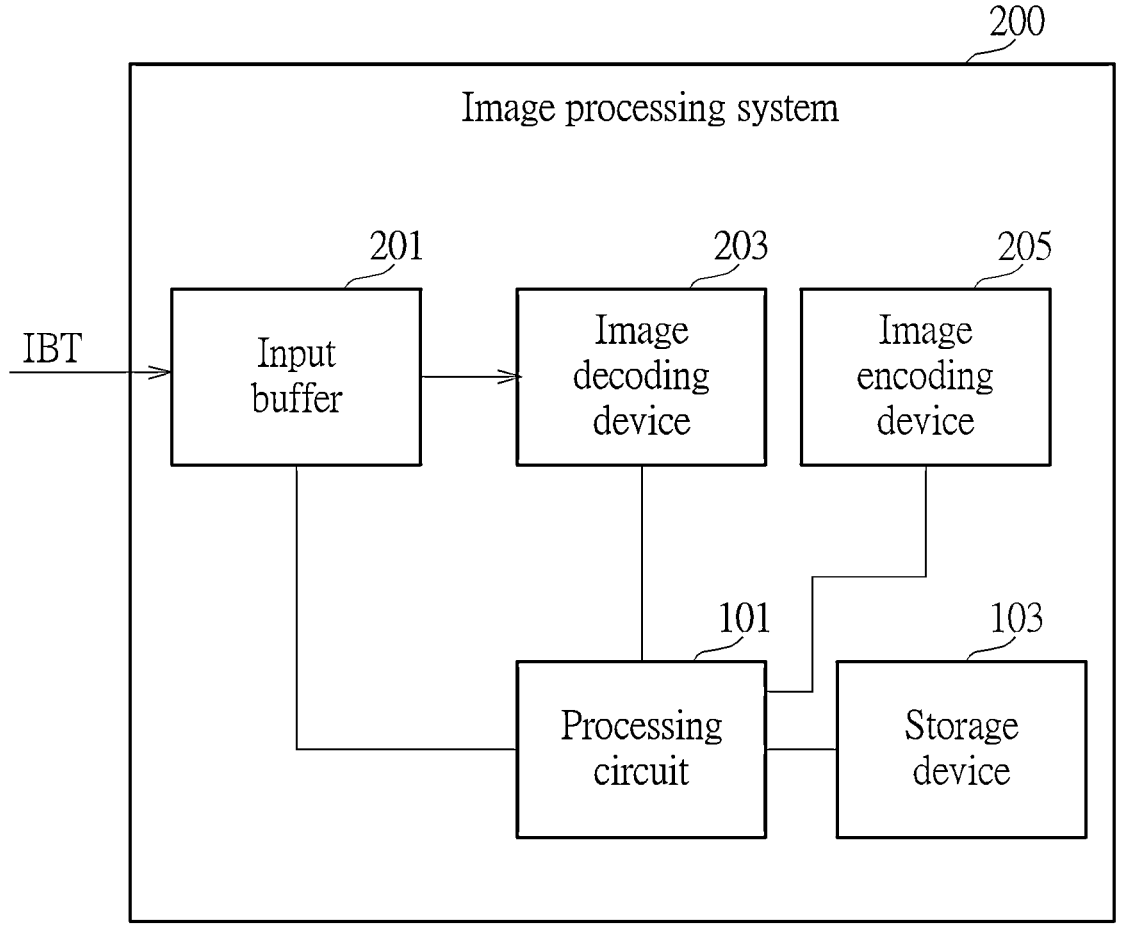
FIG. 2 is a block diagram illustrating an image processing system according to another embodiment of the present application.

The above-mentioned operation of "monitoring a reception speed of the image data Im" may be implemented by various methods. Also, the image processing device 105 may be implemented by various devices. FIG. 2 is a block diagram illustrating an image processing system according to another embodiment of the present application. In the embodiment of FIG. 2, the image processing system 200 comprises the processing circuit 101, the storage device 103, an input buffer 201, an image decoding device 203 and an image encoding device 205. The functions of the processing circuit 101 and the storage device 103 in FIG. 2 are the same as the processing circuit 101 and the storage device 103 in FIG. 1, thus descriptions thereof are omitted for brevity here.

Also, in the embodiment of FIG. 2, the above-mentioned image processing device 105 is implemented by the image decoding device 203 and the image encoding device 205. However, the image processing device 105 may comprise only one of the image decoding device 203 and the image encoding device 205. Additionally, the image decoding device 203 and the image encoding device 205 may be combined to a single codec. If the image processing device 105 is an image encoding device, the above-mentioned image processing frequency is an image encoding frequency. If the image processing device 105 is an image decoding device, the above-mentioned image processing frequency is an image decoding frequency. If the image processing device 105 is a codec, the above-mentioned image processing frequency is a frequency for image encoding and decoding. If the image processing system comprises at least one of an image encoding device, an image decoding device and a codec, the image processing system may be regarded as an image coding device.

The input buffer 201 is configured to receive an image data stream IBT. The image data buffered in the input buffer 201 is read out and decoded by the image decoding device 203 when the buffer image data is sufficient to form an image (i.e., a frame). In such case, the above-mentioned of "monitoring a reception speed of image data" is implemented by "monitoring a queuing speed of the input buffer 201, which receives the image data stream IBT". The queuing speed may mean a data accumulation speed of the input buffer 201. The image encoding device 205 may be used for various applications. For example, if a user wants to upload a video stored in the image processing system 200 to a server, the image encoding device 205 may encode the video to an image data stream and then the image processing system 200 can transmit the image data stream to the server. It will be appreciated that the operations of the input buffer 201, the image decoding device 203, and the image encoding device 205 are not limited to above-mentioned examples.

Figure 3:
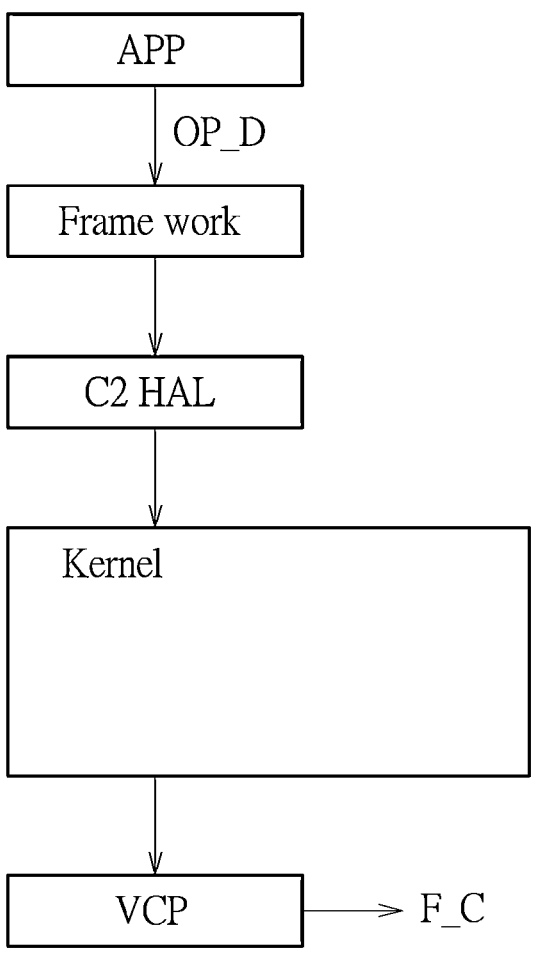
FIG. 3 is a schematic illustrating operations of the image processing system illustrated in FIG. 2, according to one embodiment of the present application.

The above-mentioned image processing frequency managing method may be implemented by any OS (Operation System), such as Windows, IOS or Android. FIG. 3 is a schematic illustrating operations of the image processing system illustrated in FIG. 2, according to one embodiment of the present application. In one embodiment, the operations of FIG. 3 are performed while the image processing system 200 is using Android. Please note, the operations in FIG. 3 and FIG. 4 may change if the image processing system 200 uses another OS.

As shown in FIG. 3, a pre-defined op rate (Operation rate) OP_D is acquired. The pre-defined op rate OP_D may be defined, for example, by an application software (APP). The C2 HAL provides control to the Kernel. The Kernel monitors the queuing speed of the input buffer 201 and may change the pre-defined op rate OP_D to a current adopted op rate. Next, the VCP generates a current image processing frequency F_C according to the current adopted op rate. The above-mentioned image decoding device 203 or the image encoding device 205 will operate at the current image processing frequency F_C. One example of details of computing the current image processing frequency F_C is explained in the embodiment of FIG. 4.

Figure 4:
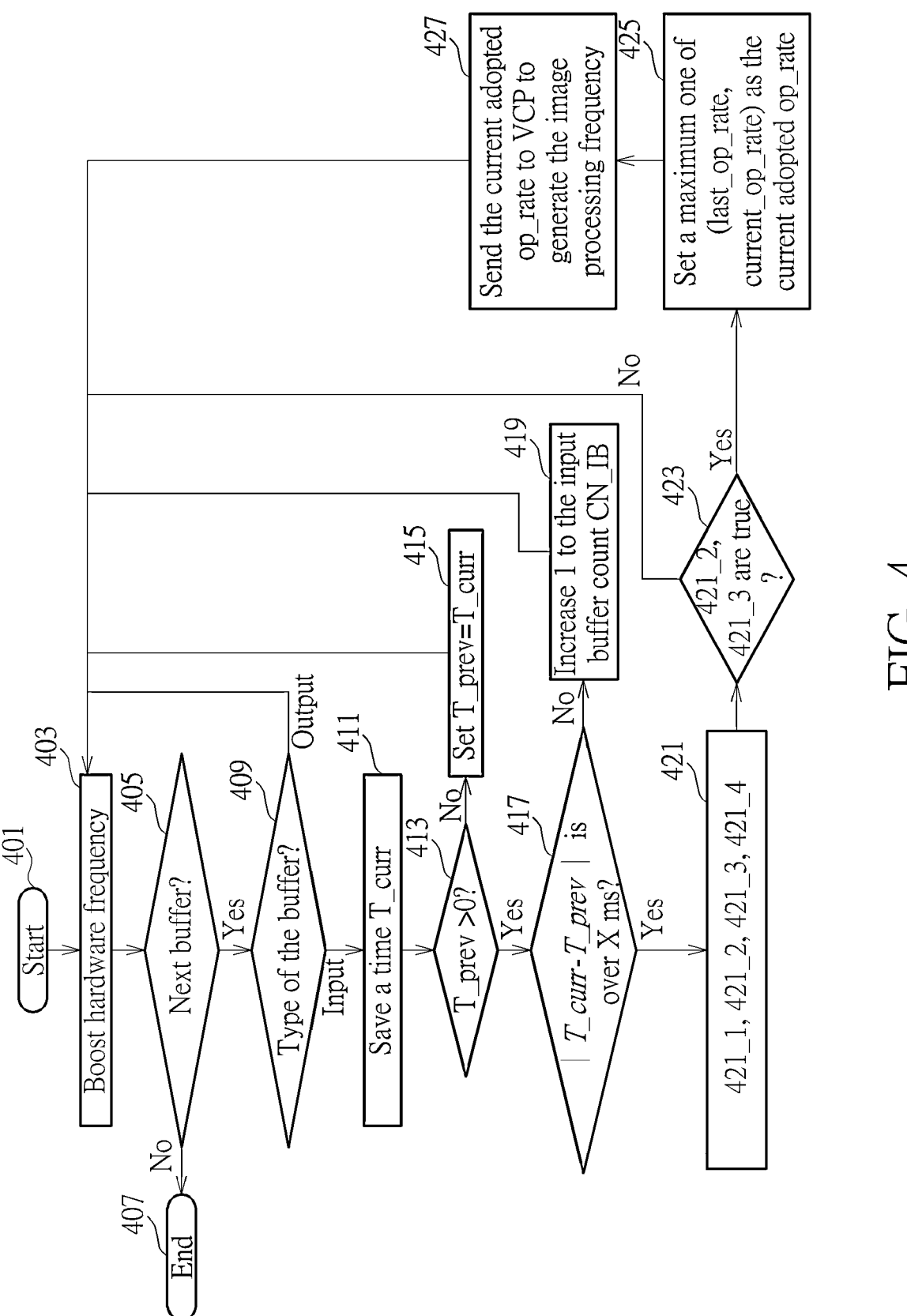
FIG. 4 is flow chart illustrating detail operations of the image processing system illustrated in FIG. 3, according to one embodiment of the present application.

FIG. 4 is flow chart illustrating detail operations of the image processing system illustrated in FIG. 3, according to one embodiment of the present application. Please note the scope of present application is not limited to the steps illustrated in FIG. 4. FIG. 4 comprises following steps:

Step 401

Start the image processing frequency managing method.

Step 403

Boost hardware frequency. Such step can ensure that the queuing speed is not limited by hardware.

Step 405

Check if any buffer needed to be queued to V4L2 framework of Kernel? If yes, go to step 409. If not, go to step 407.

Step 407

End the image processing frequency managing method.

Step 409

Check the type of the buffer. If the buffer is the above-mentioned input buffer, go to step 411. If the buffer is not the input buffer (e.g., an output buffer for storing image data after decoding), go back to step 403.

Step 411

Save a time T_curr of a current image.

For more detail, step 411 saves a time that the input buffer has received a latest image.

Step 413

Check if a time T_prev>0. If yes, go to step 417, if not, go to step 415.

The time T_prev a time that the input buffer has received a previous image. In one embodiment, the initial T_prev is 0 if the input buffer does not receive any image yet.

Step 415

Set T_prev=T_curr, then return back to step 405.

Step 417

Check if $|T_{curr}-T\_prev|$ is over X ms. If yes, go to step 421. If not, go to step 419, which does not compute a current op rate. If yes, go to step 421, which computes the current op rate.

Such step may mean that the image processing frequency is updated at time intervals of at least Xms. In one embodiment, X=500. In the embodiment of FIG. 4, the parameter "op rate" is used for computing the image processing frequency but is not the image processing frequency.

In one embodiment, the current op rates which are first N computed are ignored. N is a positive integer. Such steps also mean the image processing frequencies which are first N computed image processing frequencies will be ignored. The queuing operation of input buffer may be unstable while it is activated or being unstable in a short time period after it is activated. Accordingly, such step may acquire a more proper current op rate. Namely, N is a positive integer that the N computed image processing frequencies correspond to a preload stage of the input buffer.

Step 419

Increase 1 to the input buffer count CN_IB.

Step 421

In one embodiment, the step 421 comprises following steps:

421_1 Compute the current op rate by $$\frac{CN\_IB}{|T_{curr}-T\_prev|}$$

Based on the step 421_1 and the step 419, the op rate may represent the number of images needed to be decoded or encoded per second.

421_2 Determine if a difference between a last op rate and the current op rate is not over a difference threshold A. In one embodiment, the difference threshold A is 20% of the last op rate. The last op rate may be the last updated op rate. The last op rate may be a previous current adopted op rate in the step 425 which is updated before the time interval in the step 417.

421_3 Determine if a difference between a current adopted op rate and a maximum one of (last op rate, current op rate) is over a difference threshold B. In one embodiment, the difference threshold B is 20% of the current adopted op rate.

421_4 Set the input_buffer_count=0, T_prev=T_curr, last op rate=current op rate

The current adopted op rate means the op rate which is really used to compute the image processing frequency. Specifically, the current adopted op rate may mean an op rate which the image processing frequency is using while performing the step 421_3.

Step 423

Determine if the determination results of steps 421_2, 421_3 are yes. If yes, go to step 425. If not, go back to step 405.

In one embodiment, the step 423 is changed to "Determine if at least one of the determination results of steps 421_2, 421_3 is yes"

Step 425

Set a maximum one of (last op rate, current op rate) as the current adopted op rate. In other words, the current adopted op rate is updated, thus may be different from the current adopted op rate which the image processing frequency is using while performing the step 421_3.

The steps 421_2, 421_3, 423, and 425 may reduce the fluctuation of different image processing frequencies.

Step 427

Send the current adopted op rate to VCP, and then VCP generates the image processing frequency (e.g., the current image processing frequency F_C in FIG. 3) based on the current adopted op rate.

In one embodiment, the image processing frequency is computed based on following Equation (1), but not limited.

$$\text{Target Frequency} = \frac{\text{width} \times \text{height}}{\text{macro block size}} \times \text{operating rate} \times \text{cycle per macroblock}$$

Equation (1)

Width X height mean the size of the input buffer. The operating frequency mean the above-mentioned current adopted op rate. The macro block is a unit for processing the image each time. Also, the cycle per macro block is the number of times each macro block is processed.

The steps stated in FIG. 3, FIG. 4 can be summarized as:

The APP in FIG. 3 provides the pre-defined op rate OP_D. Next, the input buffer 201 is monitored and an average op rate is computed at time intervals of at least Xms (e.g., the current op rate in steps 419-425). Afterwards, the pre-defined op rate OP_D may be replaced by the average op rate according to the comparison of a plurality of op rates comprising the average op rate (e.g., steps 421_2, 421_3, 423, 425). Then, the image processing frequency is generated according to the final acquired op rate (e.g., the current adopted op rate in the step 427).

Figure 5:
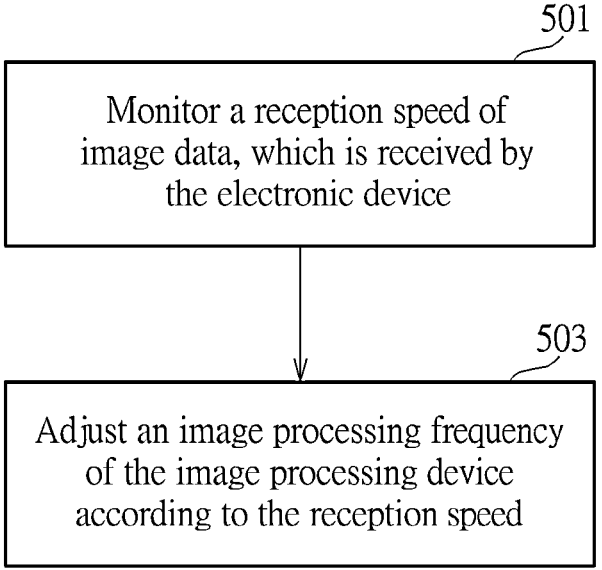
FIG. 5 is a flow chart illustrating an image processing frequency managing method, according to one embodiment of the present application.

In view of above-mentioned embodiment, an image processing frequency managing method can be acquired. FIG. 5 is a flow chart illustrating an image processing frequency managing method, according to one embodiment of the present application. The image processing frequency managing method is applied to an electronic device (e.g., the image processing system in FIG. 1) comprising an image processing device, and comprises:

Step 501

Monitor a reception speed of image data, which is received by the electronic device.

Step 503

Adjust an image processing frequency of the image processing device according to the reception speed.

In one embodiment, the following steps corresponding to FIG. 4 can be acquired:

computing a second operating rate (e.g., the current op rate in FIG. 4) according to the reception speed, while the image processing device operates at a first operating rate (e.g., the current adopted op rate in the step 421_3), wherein the second operating rate is periodically updated every first time interval (e.g., Xms in the step 417), and a target second operating rate (e.g., the current adopted op rate in step 425) is determined by a maximum one of a previously updated second operating rate (e.g., the last op rate) before the first time interval and the second operating rate that is currently updated (e.g., the current op rate in FIG. 4), such as the step 425;

replacing the first operating rate with the target second operating rate if a difference between the previously updated second operating rate before the first time interval and the second operating rate that is currently updated is smaller than a first difference threshold (e.g., step 421_2).

Based on FIG. 4, the following step can be further acquired:

replacing the first operating rate with the target second operating rate if a difference between the first operating rate and the target second operating rate is larger than a second difference threshold (e.g., step 421_3); and computing the image processing frequency of the image processing device according to the first operating rate (e.g., the step 427).

The reception speed of image data may mean the image data which is really needed to be processed. Accordingly, in view of above-mentioned embodiments, the image processing frequency can be dynamically adjusted according to actual demand.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing frequency managing method, applied to an electronic device comprising an image processing device, comprising:

(a) monitoring a reception speed of image data, which is received by the electronic device; and (b) adjusting an image processing frequency of the image processing device according to the reception speed;

wherein the step (a) monitors a queuing speed of an input buffer receiving an image data stream to acquire the reception speed;

wherein the step (b) comprises:

ignoring the image processing frequencies which are first N computed image processing frequencies, wherein N is a positive integer that the N computed image processing frequencies correspond to a preload stage of the input buffer.

2. The image processing frequency managing method of claim 1, wherein the image processing device is an image coding device, wherein the image processing frequency is one of following frequencies: an image encoding frequency, an image decoding frequency, a frequency for image encoding and decoding.

3. The image processing frequency managing method of claim 1, wherein the step (b) comprises:

computing a second operating rate according to the reception speed, while the image processing device operates at a first operating rate, wherein the second operating rate is periodically updated every first time interval, and a target second operating rate is determined by a maximum one of a previously updated second operating rate before the first time interval and the second operating rate that is currently updated;

replacing the first operating rate with the target second operating rate if a difference between the previously updated second operating rate before the first time interval and the second operating rate that is currently updated is smaller than a first difference threshold;

wherein the target second operating rate is for adjusting an image processing frequency.

4. The image processing frequency managing method of claim 3, wherein the step (b) comprises:

replacing the first operating rate with the target second operating rate if a difference between the first operating rate and the target second operating rate is larger than a second difference threshold; and computing the image processing frequency of the image processing device according to the first operating rate.

5. The image processing frequency managing method of claim 1, further comprising:

acquiring a pre-defined op rate from an operating system of the electronic device;

monitors a queuing speed of an input buffer receiving an image data stream, to generate an average op rate;

replacing the pre-defined op rate by the average op rate according to a comparison of a plurality of op rates comprising the average op rate, to adjust the image processing frequency.

6. An image processing system, comprising:

an image processing device;

a processing circuit, configured to perform following steps:

(a) monitoring a reception speed of image data, which is received by the electronic device; and (b) adjusting an image processing frequency of the image processing device according to the reception speed;

wherein the image system further comprises an input buffer, wherein the step (a) monitors a queuing speed of the input buffer receiving an image data stream to acquire the reception speed;

wherein the step (b) comprises:

ignoring the image processing frequencies which are first N computed image processing frequencies, wherein N is a positive integer that the N computed image processing frequencies correspond to a preload stage of the input buffer.

7. The image processing system of claim 6, wherein the image processing device is an image coding device, wherein the image processing frequency is one of following frequencies: an image encoding frequency, an image decoding frequency, a frequency for image encoding and decoding.

8. The image processing system of claim 6, wherein the step (b) comprises:

computing a second operating rate according to the reception speed, while the image processing device operates at a first operating rate, wherein the second operating rate is periodically updated every first time interval, and a target second operating rate is determined by a maximum one of a previously updated second operating rate before the first time interval and the second operating rate that is currently updated;

replacing the first operating rate with the target second operating rate if a difference between the previously updated second operating rate before the first time interval and the second operating rate that is currently updated is smaller than a first difference threshold;

wherein the target second operating rate is for adjusting an image processing frequency.

9. The image processing system of claim 6, wherein the step (b) comprises:

replacing the first operating rate with the target second operating rate if a difference between the first operating rate and the target second operating rate is larger than a second difference threshold; and computing the image processing frequency of the image processing device according to the first operating rate.

10. The image processing system of claim 6, wherein the processing circuit is further to perform:

acquiring a pre-defined op rate from an operating system of the electronic device;

monitoring a queuing speed of an input buffer receiving an image data stream, to generate an average op rate;

replacing the pre-defined op rate by the average op rate according to a comparison of a plurality of op rates comprising the average op rate, to adjust the image processing frequency.

\* \* \* \* \*